Patented July 31, 1945

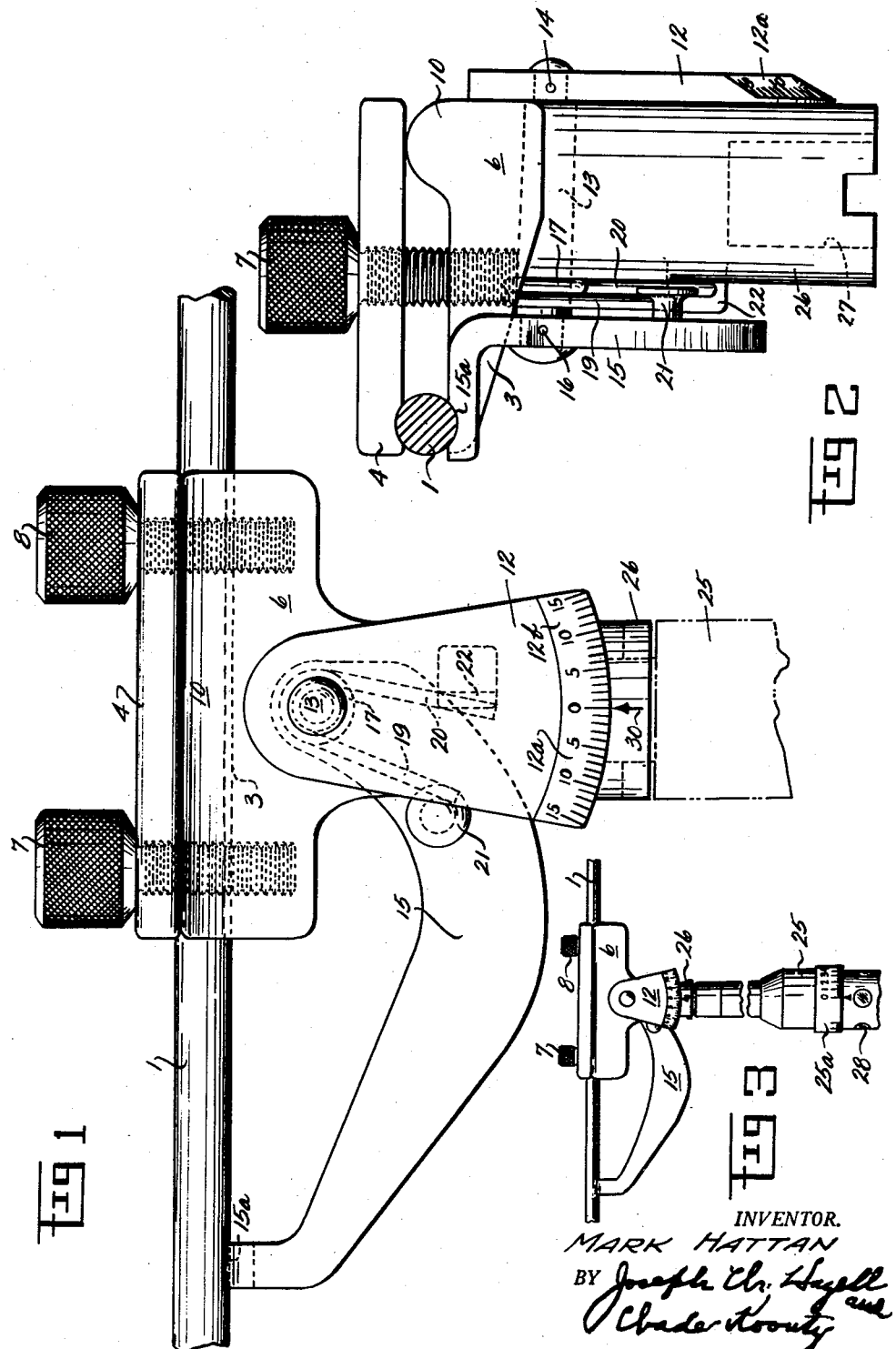

2,380,433

UNITED STATES PATENT OFFICE 2,380,433

TENSIOMETER

Mark Hattan, Dayton, Ohio

Application September 13, 1944, Serial No. 553,854

8 Claims. (Cl. 73—144)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to devices for measuring tension, and more particularly to devices for measuring tension in cables and the like.

In structures heretofore proposed for tensiometers, means are provided for clamping short lengths of a cable or the like, the tension of which it is desired to measure, the clamping arrangement being such that a deflection is produced within the length of cable so clamped. The degree of deflection is registerable on a scale means having a movable element engaging the cable, and calibrated in tensile units. The scale means is incorporated in the device and the tension in the cable or the like is ascertained directly therefrom, the calibrations being determined with reference to the force used to produce the deflection. The deflection producing force is usually a spring incorporated in the device and in some constructions of which I am aware, variable force may be applied for the purpose of enlarging the measurable range of tensions for any single device.

One of the drawbacks of many prior devices resides in the fact that engagement of the clamp with the cable is on a side of the cable opposite to that engaged by the movable element of the deflection scale so that inaccuracies are introduced when the device is used in conjunction with cables of varying thickness. A further drawback of prior constructions is the limited range of tensions measurable therewith since in many constructions the force used to produce deflection in the cable is nonvariable and, accordingly, the range of tension which can be measured with such devices is limited by the ability of the force to produce a deflection on the scale means within the upper and lower limits thereof. In constructions where the deflecting force is variable, the range of tensions measurable by any given device is still limited by the limits in variation of the deflection producing force.

It is, therefore, an object of my invention to provide a tensiometer suitable for use with cables of widely varying thickness without introducing inaccuracies in the deflection scale reading due to such variation. I provide scale means having a movable element adapted to engage a cable and clamping means adapted to clamp a portion of the cable, the arrangement being such that the point of engagement of the movable element is beyond the clamped portion and on the same side of the surface of the cable as a fixed shelf included in the clamping means and against which the cable is secured. In this construction, different thicknesses of cable produce no motion of the movable element tending to actuate the scale means, thereby eliminating the initial inaccuracies found in prior devices.

It is a further object of my invention to provide my device with a structure whereby force applying means such as torque indicating wrenches of varying ranges may be removably secured thereto for realizing a wide range of bending moments to produce deflections in cables widely varying in tension values. The tension in a cable may thus be measured by comparison of the deflection produced therein with the indicated torque required to produce that degree of deflection. In this manner, a plurality of torque indicating wrenches of varying torque indicating ranges may be selectively secured to my device for measuring corresponding ranges of tension, whereby the overall tension measuring range of my device is increased accordingly.

Other objects and features of my invention will be apparent from the detailed description which follows, with reference to the appended drawing in which:

Fig. 1 is a view of the device showing the manner of attachment to a cable;

Fig. 2 is a transverse view of the device showing it in relation to a section taken through the cable; and, Fig. 3 is a generally exterior view of the device showing a particular type of torque indicating wrench secured thereto.

With reference to the figures of the drawing, a cable 1 is shown having a short length thereof secured between a pair of clamping elements comprising a shelf 3 and a plate 4. The shelf 3 is preferably integral with the body 6 of the device and the plate 4 is movable with relation thereto for the purpose of clamping various thicknesses of cables against shelf 3 by means comprising two thumb screws 7 and 8 coacting with threads in body 6, and a raised portion 10 of the body 6 is adapted to provide fulcrum reaction against plate 4. A scale 12 having clockwise and counterclockwise indicia 12a and 12b, respectively, thereon is pivotally secured by means of a shaft 13 to body 6, the shaft 13 passing through body 6. Scale 12 is disposed at one end of shaft 13 and keyed thereto by a pin 14. An arm 15 is keyed by pin 16 at the opposite end of the shaft 13 and extends beyond the body 6 and the clamping elements 3 and 4 into engagement with the cable 1, being biased thereagainst by a spring 17 looped about shaft 13 and having legs 19 and 20 extended to react against an abutment 21 on arm 15 and an abutment 22, respectively. Abutment 22 is formed by welding a lug of angular shape to body 6. The body 6 has depending therefrom means for securing a torque indicating wrench 25 thereto and comprising a generally cylindrical member 26 having an end recess 27 adapted to receive the work head end of the torque indicating wrench 25 of a type used in conjunction with detachable work heads, such as is disclosed in my copending applications Serial Nos. 544,127 and 544,128. The wrench as disclosed in the copending applications has a signal lamp adapted to light upon application of a predetermined torque, the light being visible through ports 28, whereby an operator is readily apprised of a predetermined bending moment having been reached. It is to be understood, however, that the tensiometer herein disclosed is in no way limited to a torque indicating wrench of the type described, and in fact, any suitable torque indicating wrench adapted to removably engage the body member 6 for providing bending moments to produce deflections in cable 1 may be utilized.

A particular feature of the device is the co-action between arm 15 and shelf 3, the arrangement being such that the line of engagement 15a of arm 15 with cable 1 is on the same side thereof as the side of the cable engaging shelf 3, whereby, the scale 12 having been originally set to read at the zero point with reference to an index mark 30 on body member 6 when the engaging line 15a is in alignment with shelf 3, it will be apparent that the scale will remain at the zero point regardless of the thickness of any cable clamped in the device.

In operation, the wrench 25, having been inserted in the wrench holding means 26, a torque stress is exerted on the wrench in the plane of the cable, a bending moment being thus transmitted through the body member 6 to which the cable is clamped, causing a deflection in the cable. The extent of deflection is registered on one of the sets of indicia 12a or 12b of scale 12 with reference to the index mark 30 by virtue of the misalignment of engaging line 15a and the shelf 3. Such misalignment causes the arm 15 to rotate the scale 12 either clockwise or counterclockwise, depending upon the direction of torque stress applied to the wrench 25. In this manner, tension in cable 1 is measurable by comparison of the torque force exerted by wrench 25 and the deflection produced thereby as registered on scale 12, there being several methods of making such comparison, as will now be described.

One such method is to set the torque indicating indicia 25a of wrench 25 so that the signal means of the wrench will be responsive to a predetermined torque, whereby in conjunction with a previously prepared numerical table, the degree of deflection obtained with this specific torque reading is translated into the amount of tension existing in the cable. Conversely, tension may be measured by deflecting the cable to an arbitrary degree and ascertaining the indicated torque required to produce such deflection, whence reference to a previously prepared numerical table will yield the amount of tension in the cable. Similarly, graphs may be used instead of numerical tables for the same purpose, there being a suitable number of such graphs or tables available for use with the tensiometer to cover the overall range provided by a plurality of indicating wrenches of different ranges.

Preparation of simple tables or graphs to be used in the manner hereinabove described are regarded as within the mechanical skill of persons familiar with the art and specific experimental or calculating procedures are not deemed a necessary part of the disclosure of applicant's invention.

Another manner of ascertaining tensions in cables by means of the tensiometer herein disclosed would be to calibrate either the indicia of the torque indicating wrench 25 or the scale 12 to read directly in tensile units with reference to a selected point or points on the indicia of the other. Further, a plurality of indicia scales could be provided on the scale 12 reading directly in tensile units for use in conjunction with a plurality of torque indicating wrenches of varying ranges. Other variations in the mechanics of comparing the deflection of the cable with the torque producing such deflection are possible and the invention is not limited to the several described.

Having thus described my invention, I claim:

1. A tensiometer for measuring tension in cable-like members comprising, in combination, a clamp adapted to be clamped to a length of cable and deflection scale means associated therewith and having a movable member adapted to engage said cable, and a torque indicating wrench means adapted to exert a bending moment on said cable through bodily motion of said clamp to cause deflection of said cable, whereby the deflection of said cable is registered on said scale means and whereby the tension in said cable is measurable by comparison of the indicated torque producing said bending moment and the deflection registered on said scale means.

2. In a tensiometer as set forth in claim 1, including means for removably securing said torque indicating wrench means to said clamping means, whereby bending moment is exerted therethrough and whereby torque indicating wrench means of varying torque indicating ranges may be selectively secured to said clamping means for measuring corresponding ranges of tension.

3. A tensiometer for measuring tension in cable-like members comprising, in combination, a device adapted to be clamped to a length of cable and including deflection scale means pivotally associated therewith and having an arm adapted to engage said cable, and a torque indicating wrench means having torque indicating indicia readable thereon and operatively connected to said device to exert a bending moment on said cable through bodily motion of said device, whereby the deflection in said cable is operative to cause motion of said arm to register the degree of deflection on said scale means for the purpose of measuring tension in said cable by comparison of the degree of deflection therein with the indicated reading of said torque indicating means corresponding to the degree of bending moment exerted on said cable.

4. In a tensiometer for measuring tension in cable-like members, clamp means adapted to be clamped to a length of cable, a scale pivotally associated with said clamp means and an arm provided on said scale and adapted to extend into engagement with said cable at a point beyond said clamped length, an index mark on said clamp means for coaction with indicia of said scale, a torque indicating wrench means operatively connected to said clamp means to exert a bending moment on said cable through bodily motion of said clamp means, the deflection of said cable due to bending moment being operative through engagement of said cable with said arm to deflect said scale relative to said index mark, whereby the tension in said cable is measurable by comparison of the degree of deflection registered on said scale and the indicated torque of said torque indicating means corresponding to the bending moment exerted on said cable through said clamp means.

5. In a tensiometer as set forth in claim 4, including means adapting said torque indicating wrench means to be removably associated with said clamp means, whereby a plurality of torque indicating wrench means of varying ranges of torque indication may be selectively associated with said clamp means for measuring corresponding ranges of tension.

6. In a tensiometer for measuring tension in cable-like members, a body member comprising a relatively fixed shelf means adapted to abut a length of cable on one side of the surface thereof, and means on said body member for clamping said length of cable against said fixed shelf means, scale means pivotally secured to said body member and having lever means biased to engage said cable at a point beyond the length clamped to said shelf means and on the same side of the surface of said cable abutting said shelf means, said scale means having a zero setting with reference to an index mark on said body member when said clamped length of said cable is in alignment with the point of engagement of said lever means, and torque indicating wrench means operatively connected to said body member to exert a bending moment on said cable to misalign said clamped length of cable and said point of engagement of said lever means, whereby the extent of said misalignment is registerable on said scale means and the tension in said cable measurable by said registered extent of misalignment with reference to the indicated torque of said torque indicating wrench means corresponding to the bending moment exerted on said cable.

7. In a tensiometer as set forth in claim 6, including means adapted to removably secure said torque indicating wrench means to said body member, whereby a plurality of torque indicating wrench means of varying torque indicating ranges may be selectively secured to said body member to measure corresponding ranges of tension.

8. In a tensiometer as set forth in claim 6 wherein said scale means has indicia extending on opposite sides of said index mark for registering the extent of misalignment in said cable caused by clockwise or counterclockwise bending moments.

MARK HATTAN.